United States Patent [19]

Gardner

[11] Patent Number: 5,478,091
[45] Date of Patent: Dec. 26, 1995

[54] DYNAMIC SEAL AND RELATED CONTROL CABLE

[75] Inventor: Michael J. Gardner, Maple Heights, Ohio

[73] Assignee: IMO Industries, Inc., Hudson, Ohio

[21] Appl. No.: 224,663

[22] Filed: Apr. 7, 1994

[51] Int. Cl.$^6$ ............................................. F16J 15/32
[52] U.S. Cl. .................... 277/152; 277/208; 277/227; 74/502.5; 74/502.6
[58] Field of Search ............................... 277/24, 152, 178, 277/189, 208, 227, DIG. 6; 74/502.4, 502.5, 502.6

[56] References Cited

U.S. PATENT DOCUMENTS

| | | | |
|---|---|---|---|
| 2,416,206 | 2/1947 | Norton | 74/501 |
| 2,601,791 | 1/1952 | Morse | 74/501 |
| 2,706,494 | 4/1955 | Morse | 138/57 |
| 3,130,976 | 4/1964 | Niswander | 277/178 |
| 3,532,446 | 10/1970 | Herreshoff | 417/511 |
| 4,038,881 | 2/1977 | Conrad | 74/501 P |
| 4,075,158 | 2/1978 | Coale . | |
| 4,079,950 | 3/1978 | Langford | 277/152 |
| 4,180,346 | 12/1979 | Blake | 74/502.6 X |
| 4,193,319 | 3/1980 | Langford | 74/501 R |
| 4,321,840 | 3/1982 | Kalamon | 74/501 R |
| 4,334,687 | 6/1982 | Hölzer et al. | 277/151 |
| 4,387,902 | 6/1983 | Conover | 277/203 |
| 4,398,731 | 8/1983 | Gorman et al. | 277/124 |
| 4,493,662 | 1/1985 | Taguchi | 440/83 |
| 4,534,239 | 8/1985 | Heimann | 74/502.5 X |
| 4,541,303 | 9/1985 | Kuzuniski | 74/501 R |
| 4,685,350 | 8/1987 | Bauer et al. | 74/501 R |
| 4,695,061 | 9/1987 | Meisner et al. | 277/27 |
| 4,744,571 | 5/1988 | Geberth, Jr. | 277/208 |
| 4,751,870 | 6/1988 | Grambling | 92/209 |
| 4,773,279 | 9/1988 | Spease et al. | 74/502.4 |
| 4,833,937 | 5/1989 | Nagano | 74/501.5 R |
| 4,852,891 | 8/1989 | Sugiura et al. | 277/208 |
| 4,865,170 | 9/1989 | Ciepichal | 188/322.17 |
| 4,884,467 | 12/1989 | Martell | 74/501.5 R |
| 4,892,005 | 1/1990 | Nagano | 74/502.6 X |
| 4,898,046 | 2/1990 | Mancewicz et al. | 74/502.5 |
| 4,995,623 | 2/1991 | Wada et al. | 277/208 |
| 5,014,569 | 5/1991 | Kelley | 74/502.4 |
| 5,018,752 | 5/1991 | Thomas | 277/152 |
| 5,031,923 | 6/1991 | Davies | 277/124 |
| 5,035,272 | 7/1991 | Kawase | 141/312 |
| 5,085,444 | 2/1992 | Murakami et al. | 277/154 |
| 5,144,856 | 9/1992 | Roca | 74/501.5 R |
| 5,152,540 | 10/1992 | Kuze | 277/208 |
| 5,210,123 | 5/1993 | Caporiccio . | |
| 5,241,880 | 9/1993 | Mizobata et al. | 74/502.5 |
| 5,245,887 | 9/1993 | Tanaka et al. | 74/502.5 |
| 5,363,719 | 11/1994 | Johnson et al. | 74/502.6 X |
| 5,380,016 | 1/1995 | Reinsma et al. | 277/152 |

FOREIGN PATENT DOCUMENTS

| | | | |
|---|---|---|---|
| 1906635 | 8/1970 | Germany | 74/502.5 |
| 2093113 | 4/1990 | Japan | 74/502.5 |

*Primary Examiner*—William A. Cuchlinski, Jr.
*Assistant Examiner*—Scott W. Cummings
*Attorney, Agent, or Firm*—Jansson & Shupe, Ltd.

[57] ABSTRACT

Disclosed is a new dynamic sealing device and a related remote control cable. The device, made of a thermoplastic polyurethane, has a pair of sealing ridges of differing diameter which bear against a rod moving with respect to the outer cable portion, i.e., the conduit. The outer ridge excludes airborne contaminants and the inner ridge retains a synthetic lubricant. The jacket of the cable core is made of nylon 12 which, like the thermoplastic polyurethane and the lubricant, has PTFE as a constituent. The "gap" between the core and the conduit is decreased compared to corresponding prior art cable and the core jacket thickness is about three times that of corresponding prior art cable. Core column strength is about doubled and the new device and cable exhibit a number of other performance advantages as explained in the specification.

26 Claims, 7 Drawing Sheets

DYNAMIC SEAL AND RELATED CONTROL CABLE

FIELD OF THE INVENTION

This invention relates generally to joint packings and machine elements and mechanisms and, more particularly, to dynamic seals and to related control cables used for manipulating levers and the like from a remote location.

BACKGROUND OF THE INVENTION

Many types of machines such as construction equipment and watercraft have mechanisms, the positions of which need to be changed from time to time as the machine is operated. For example, construction "dozers" and agricultural tractors usually employ hydraulic valves, the mounted location of which is well removed from the location of the machine operator. However, the operator needs to change the valve position from time to time to, e.g., raise a dozer blade, lower a plow or the like.

Many types of watercraft, e.g., pleasure and commercial vessels, present a similar requirement. The helmsperson is required to manipulate steering linkages, engine throttles and the like from the remotely-located vessel helm. Commercial buses have similar requirements in that the driver must control the throttle of the engine (which may be at the rear of the bus) or control the transmission using a nearby foot treadle or control handle, respectively.

Remote control cables (and seals used therewith) have been used for decades for such purposes. A common type of control cable has an outer "conduit" which is held stationary by anchoring it with a clamp or to a bulkhead or the like. An inner "core" is spaced from and movable with respect to the conduit. Often, lubricant is applied between the conduit and the core to reduce friction. A "dynamic seal," i.e., one sealing between the stationary cable sleeve and the moving, rigid rod portion of the core, is used to confine the lubricant in the cable and exclude airborne dirt particles.

In a typical application, the rigid rod at one end of such core is coupled to a control handle or steering mechanism manipulated by the machine operator. The other end of the core is coupled (also by using a rod or the like) to that which is being remotely controlled, e.g., a hydraulic valve, engine throttle or outboard motor steering linkage. When the control handle is manipulated, the core is "pushed" or "pulled." That is, the core is placed in compression or tension, respectively.

Such remote control cables are ideal in many applications since they are generally straightforward in application (as compared to electronic controls, for example) and relatively easy to maintain. A leading manufacturer of such remote control cables is Morse Controls Division of IMO Industries, Inc., Hudson, Ohio.

Notwithstanding the enormous acceptance of such remote control cables, they are not without problems. One relates to a physical characteristic known as "column strength" which is a factor limiting the compressive force which can (or at least should) be applied to the core when the core is pushed. Column strength is a limitation since if too much compressive force is applied, the core tends to deform by "kinking" or buckling and/or to be urged to "sliding-friction-contact" with the inner surface of the conduit. As a result, the remote control arrangement may operate only by applying excessive force to the control handle.

Another disadvantage involves the core-conduit lubricant. Lubricants prior used in such applications tend to create more "drag" than is desired. And the configuration of the dynamic seal is such that the lubricant leaks past the seal to the exterior of the rod. Such leaked lubricant attracts airborne dirt particles which, in turn, can migrate into the cable and shorten its life, sometimes materially. Or the dynamic seal is inadequate to satisfactorily exclude such dirt, even if no leaking lubricant is present.

Earlier efforts to resolve the leakage and dirt migration problems have involved seals which "squeeze" against the moving rod very tightly and/or have a large surface area contacting such rod. Seals of the former type tend to wear quickly and either approach increases the effort required to manipulate the control handle and diminishes the positioning accuracy with which such manipulation is performed. And if the seal is sufficiently "loose" against the rod to reduce operating effort to an acceptable level, such seal does a less-than-exemplary job of sealing lubricant inside the cable while excluding dirt.

Yet another disadvantage of known control cables involves the conduit, the core and a physical phenomenon known as the "coefficient of friction" between such conduit and core. Generally speaking, the effort required to manipulate a control handle is proportional to the coefficient of friction with higher coefficients resulting in greater effort.

Coefficients of friction are of two types. One is the "static" coefficient of friction, i.e., that between the core and conduit when the core is stationary but being urged to move. The "dynamic" coefficient of friction (or sliding coefficient of friction, as it is sometimes referred to) is that between the core and conduit when the core is moving inside the conduit. In known control cables, static and dynamic coefficients of friction on the order of 0.22 and 0.29, respectively, are exemplary.

Still another disadvantage of known control cables involves what are known in the industry as "backlash" and "lost motion." Backlash is measured at low cable load and is the motion required (in linear measurement) at the cable input end, i.e., at the control handle end, before motion occurs at the output end. Lost motion involves the same measurement but at high cable load.

Heretofore, designers of control cables have resorted to increasing the radial dimension of the annular space or "gap" between the core and the conduit in an effort to reduce friction and make the core easier to move. But increasing the dimension of such space has the undesirable result of increasing backlash and lost motion. On the other hand, decreases in such radial dimension often resulted in cables which exhibited high friction and were hard to operate.

A new dynamic sealing device and related control cable which addresses the above disadvantages and which makes possible a remote control installation exhibiting improved frictional, column strength and sealing capabilities would be an important advance in the art.

OBJECTS OF THE INVENTION

It is an object of the invention to provide an improved dynamic seal and related control cable overcoming some of the problems and shortcomings of the prior art.

Another object of the invention is to provide an improved dynamic seal and related control cable which reduce control handle effort.

Another object of the invention is to provide an improved dynamic seal which more satisfactorily retains lubricant within a control cable.

Yet another object of the invention is to provide an improved dynamic seal which more satisfactorily excludes airborne contaminants from a control cable.

Another object of the invention is to provide a dynamic seal which is optimized to provide an improved combination of reduced drag force, reduced lubricant leakage and endurance over hundreds of thousands of cycles of operation.

Still another object of the invention is to provide a control cable with a core having improved column strength over cores of comparable earlier control cables.

Another object of the invention is to provide an improved control cable exhibiting dramatically-reduced static and dynamic coefficients of friction.

Another object of the invention is to provide a control cable exhibiting more favorable backlash and lost motion characteristics.

How these and other objects are accomplished will become more apparent from the following descriptions and from the drawing.

SUMMARY OF THE INVENTION

The invention involves a device such as a dynamic seal for sealing the thin annular space between a stationary portion of a control cable, e.g., the cable sleeve, and a control member mounted for movement with respect to such sleeve. (Typically, a "control member"—often in the form of a rigid rod—is used at both the input and output ends of a control cable.) The sealing device (a) has a first end and a second end, (b) has a first ridge at the first end which seals against the control member, and (c) is attached to the sleeve at the second end.

In the improvement, the sealing device includes a second ridge between the first ridge and the second end and spaced from the first ridge, preferably by at least 1.5 to 2 times the axially-measured dimension of a ridge base portion. The control cable has a lubricant within it (between the cable conduit and the cable core) and such cable is surrounded by ambient air which, very often, has airborne particulate contaminants.

The first ridge (that ridge closest to the device exterior) substantially prevents the contaminants from entering the cable. On the other hand, the second ridge substantially retains the lubricant within the cable. To put it another way, the new sealing device "segregates" the lubricant-retention function from the contaminant-excluding function. For lubricant to escape or for contaminants to enter, either must get past both ridges, an unlikely event.

In another aspect of the invention, each of the ridges is generally triangular in cross-section. And each such ridge has an apex-like edge with an included angle. In a highly preferred arrangement, the included angle of the first ridge and that of the second ridge are substantially equal to one another and are about 90°.

The rod-like control member has a central axis extending along it. Each of the ridges has an "interior-directed" face, i.e., a surface facing generally toward what may be referred to as the interior portion of the cable. Each such interior-directed face defines an included face angle with the central axis and in the preferred embodiment, such face angles are substantially equal to one another.

Further, each of the ridges has an "exterior-directed" face, i.e., a surface facing generally toward the rod-engaging end of the device. Each exterior-directed face also defines an included face angle with the central axis and, preferably, such face angles are substantially equal to one another. In a most highly preferred configuration, all of the face angles (those involving both the interior and exterior-directed faces) are substantially equal to one another and are about 45° (or 135°, depending upon how the face angle is measured)

In another aspect of the invention, the first ridge of the sealing device has an edge circumscribing a first ridge area, i.e., the area of the circular opening bounded by such edge. Similarly, the second ridge has an edge circumscribing a second ridge area and in the preferred embodiment, the ridge areas are different from one another so that they provide different "squeeze factors" as to the rod or rod-like control member against which they seal.

Considering such first and second ridge areas in view of the rod cross-sectional area, the first ridge area is preferably in the range of 10–18% less than the rod cross-sectional area and most preferably is about 12–14% less than such area. Further, the second ridge area is preferably in the range of 7–11% less than the rod cross-sectional area and most preferably is about 9% less than such area. Since the rod and the first ridge fit somewhat more snugly to one another, the first ridge is said to have a greater squeeze factor.

In a highly preferred embodiment, the sealing device is of one-piece construction. Such device is made of a homogeneous plastic-like material, e.g., a thermoplastic polyurethane, having about 15% polytetrafluoroethylene (PTFE) entrained therein. That is to say, the plastic-like material is homogeneous and the PTFE is blended uniformly throughout such material rather than being "layered" or "faced" thereon. The new sealing device provides dramatically improved performance and was discovered only after repeated tests of a number of devices having several other configurations.

Yet another aspect of the invention involves the combination of the new sealing device and the related control cable. In the cable, the rod-like control member is coupled to a core coaxial with such control member. (Often, the core includes a spiral-wrapped stranded wire "rope." Such rope has great strength and can rather readily be bent around corners and the like.) The core has a jacket and in the invention, such jacket is formed of a material which includes polytetrafluoroethylene (PTFE).

Preferably, such jacket material is a homogeneous material known as nylon 12 and has about 15–25% by weight (most preferably, about 20%) PTFE powder blended uniformly throughout. Significantly, such material has been known for an estimated two decades—the ingenuity and persistence of the applicant were required to successfully apply it to remote control cables. Insofar as is known, applicant is the first to do so.

In a control cable, the conduit and the core (and, specifically, the core jacket if there is a jacket) have a coefficient of friction (dry) with respect to one another. In the invention, the dry coefficient of friction is less than about 0.20.

More specifically, the static coefficient of friction is less than about 0.12 and the dynamic coefficient of friction is less than about 0.18. This compares to dry static and dynamic coefficients of friction of about 0.22 and 0.29, respectively, in corresponding prior art cable.

Certain types of control cables use a conduit (that part of the cable in which the core moves) which has an inner liner. A "liner" is often referred to as such since it is inside the conduit and is a separate conduit layer. Further, certain types of remote control cables use a core having a jacket surrounding the aforementioned wire rope and have a lubricant between the liner and the jacket. In another aspect of the invention, the lubricant is a synthetic lubricant.

Preferably, such lubricant has a National Lubrication Grease Institute (NLGI) index of between 1.2 and 1.8, most preferably about 1.5. (Such index is roughly analogous to viscosity of motor oil.) The preferred lubricant contains at least about 10% by weight PTFE powder and most preferably about 20–30% PTFE powder. Such lubricant has been in use for an estimated 15 years for aircraft non-control-cable applications and has been available to all manufacturers of remote control cables. Insofar as is known, applicant is the first to discover how such a lubricant may advantageously be used in control cables.

In the objects of the invention, mention was made of a control cable having a core with improved column strength. In the invention, the jacket has a cylindrical wall which is annular in cross-section. In a preferred cable, the wall has a radial thickness in excess of about 0.029–0.030 inches. This compares to a thickness of about 0.0155 inches in the corresponding prior art cable. And most preferably, the wall thickness is in excess of about 0.040, e.g., about 0.047 inches.

Such increase in wall thickness (by up to a factor of 3) contributes dramatically to the column strength of the core, increasing it up to about twice that of the core column strength of the corresponding prior art cable. A benefit of such increased column strength is that when the control cable is used in applications where the core must be "pushed" (placed in compression), much higher forces can be applied without substantial risk of core deformity.

In other words, the core has a much-reduced tendency to flex when loaded in compression. This provides greatly enhanced fatigue resistance and useful product operating life. And unlike the corresponding prior art cable, the new cable is free of "armor" around the wire rope central portion. An armor-free core is significantly less expensive to manufacture. (An "armor" core has a wire rope central portion spirally over-wrapped with an "armor" comprising a thin, ribbon-like steel band swaged in place. The jacket overlays such armor or, in the new cable, the wire rope.)

In a remote control cable, there is an annular "gap" or space between the inner liner and the core. In the invention, the radial dimension of the space does not exceed about 0.0075 inches. Such dimension represents a reduction of about 0.0025 inches from the radial dimension of the space in the corresponding prior art cable. And as noted above, a reduced gap dimension reduces backlash and lost motion, very desirable results.

Further details regarding the new sealing device and the related remote control cable are set forth in the following detailed description and in the drawing.

DETAILED DESCRIPTION OF THE PREFERRED EMBODIMENTS

Before describing the several, highly-innovative features of the inventive device 10 and related cable 11, it may be helpful to have a better understanding of how the device 10 and cable 11 may be used. In fundamental terms, both are used to transmit "pushing" and/or "pulling" force from one location, typically that of a machine operator, to another location, i.e., that of the lever, linkage or the like which is being controlled.

Figure 1:
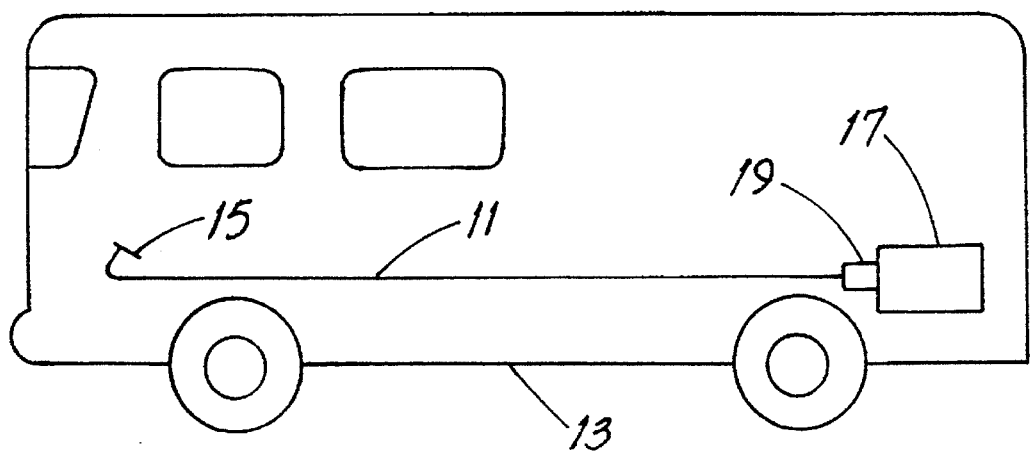
FIG. 1 is a side elevation view in phantom representation showing a typical application, a bus accelerator control, for the invention.

In FIG. 1, the bus 13 has an accelerator pedal 15 mounted near its forward end and a rear-mounted engine 17 having a throttle linkage 19. A flexible control cable 11 extends between the pedal 15 and the linkage 19 so that pedal pressure accelerates the engine 17—and the bus 13.

Figure 2:
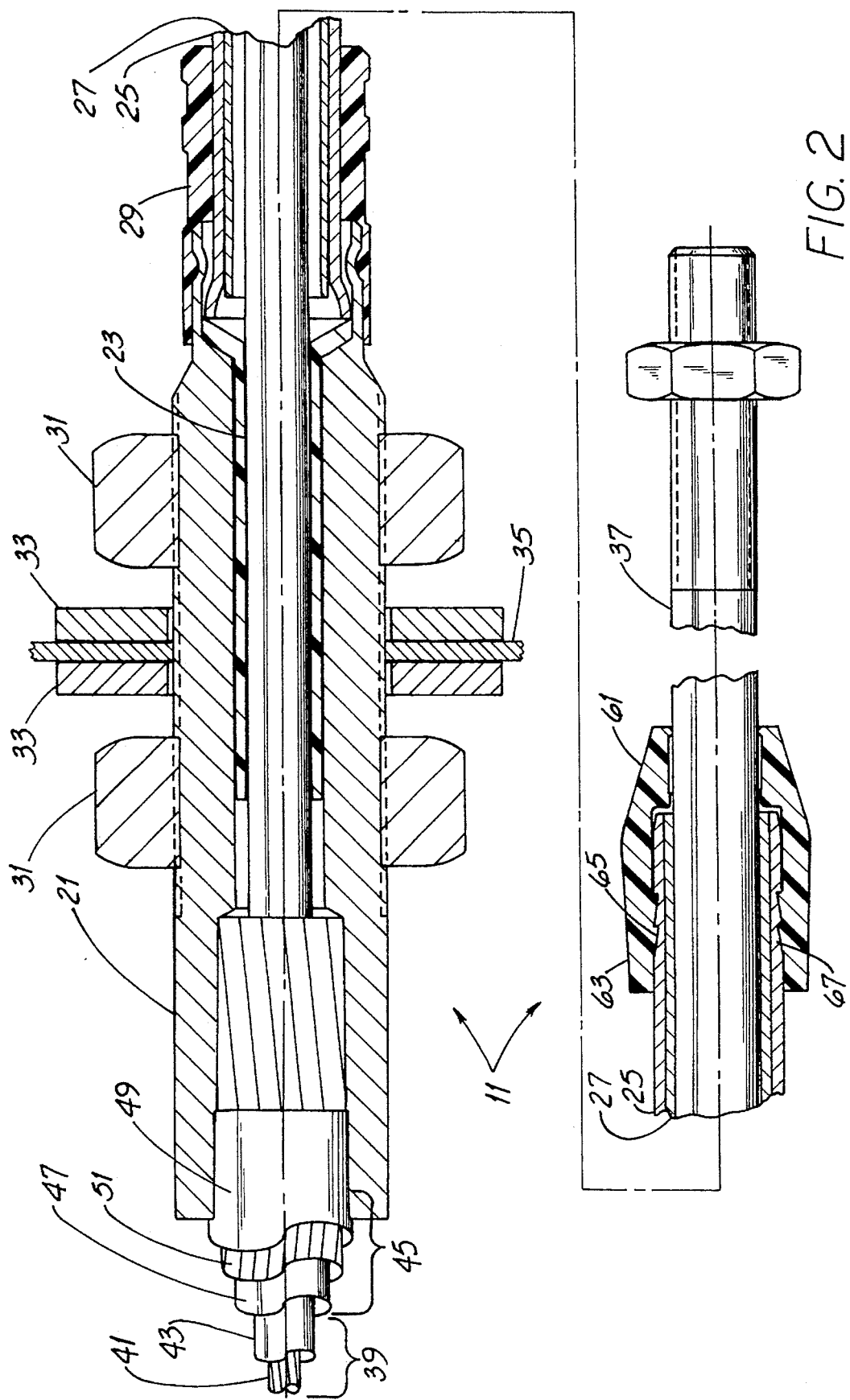
FIG. 2 is a side elevation view, partly in cross-section, of the new flexible control cable. Parts are shown in cross-section and other parts in full representation.
Figure 4:
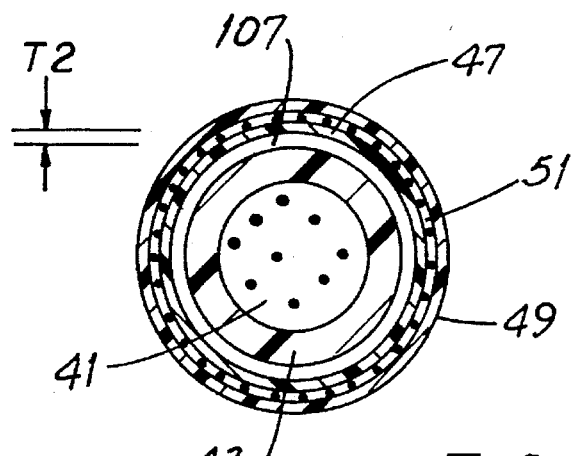
FIG. 4 is an enlarged end elevation view in full cross-section of the conduit and core portion of the cable of FIG. 2 and taken in the viewing plane 4—4 thereof.
Figure 3:
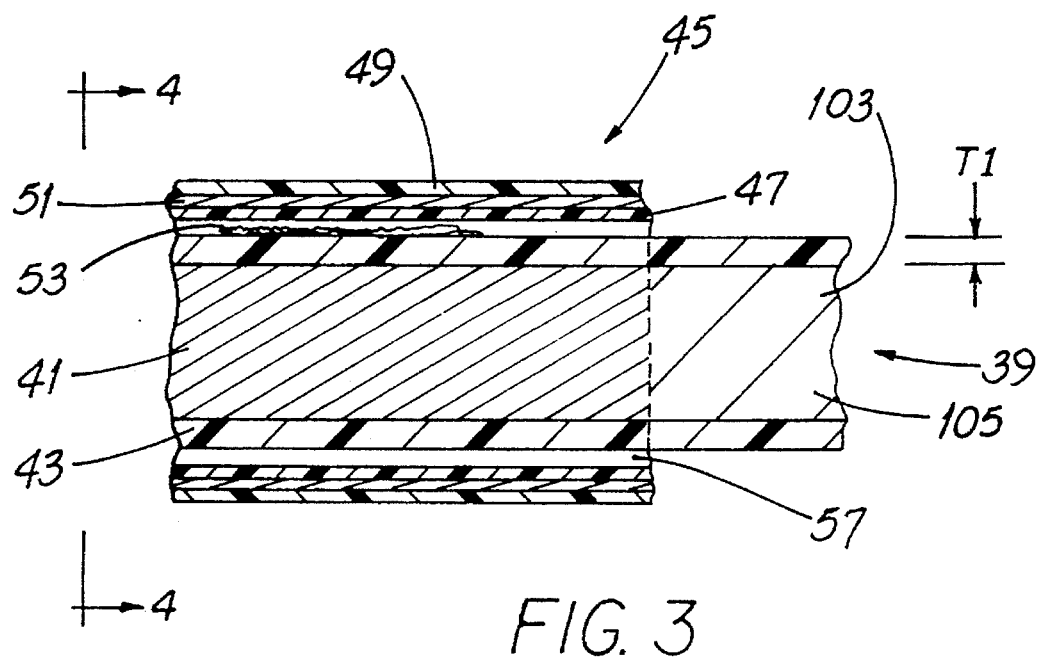
FIG. 3 is an enlarged side elevation view in full cross-section of the conduit and core portion of the cable of FIG. 2.

Referring to FIGS. 2, 3 and 4, various component parts of the control cable 11 will now be identified. Such cable 11 has a tube-like outer hub 21 which includes a liner 23. Telescoped into the hub 21 is a sleeve 25 which has a sleeve liner 27. A sleeve seal 29 prevents contaminants from entering the cable 11 between the sleeve 25 and hub 21.

Two nuts 31 and two washers 33 are used to secure the cable 11 in position through a bulkhead (a vehicle floor or firewall, for example) and the nuts 31 are tightened for holding. Another closely similar arrangement (not shown) has a groove-like "radius" in the hub 21. Rather than using nuts 31, a clamp is applied at the radius to hold the cable 11 in position.

Each end of the cable 11 (only one end being shown) has a rigid, rod-like control member 37 to which is attached the "input mechanism," e.g., the accelerator pedal 15 shown in FIG. 1, or the controlled lever "output mechanism", a linkage or the like, such as the engine throttle linkage 19. The surface finish of such member 37 is preferably in the range of 14–20 microinch RMS.

Interposed between the control members 17 is a core 39. The core 39 has an interior portion comprising a stranded, spiral-wound wire rope 41 overlayed with a concentric core jacket 43. (Such rope 41 has great strength and can rather readily be bent around corners and the like.) It should be appreciated, however, that some control cables use a solid, flexible wire in place of the rope 41 or may have other core configurations. It is the core portion of the cable 11 which moves and transmits force, pushing or pulling force, between the control members 37.

Surrounding and slightly spaced from the core 39 is a conduit 45 which is stationary with respect to such core 39. Such conduit 45 has an inner liner 47, an outer covering 49 and a reinforcing wire braid 51 between the liner 47 and the covering 49. Commonly, a lubricant 53 is between the core jacket 43 and the conduit liner 47 to help reduce friction.

Adjacent to each control member 37 is the above-noted sleeve 25 which, like the conduit 45, is stationary with respect to the core 39. Between the sleeve 25/sleeve liner 27 and the control member 37 is a very thin annular clearance 55 which leads into the interior of the cable 11 and is in communication with the space 57 between the conduit 45 and the core 39.

From the foregoing, two facts are apparent. One is that absent other structure, the lubricant 53 can leak out through the clearance 55 and its effectiveness lost. Another is that airborne dirt particles 59 can enter the clearance 55, abrade the jacket 43 and the liner 47 and materially shorten the life of the cable 11. Lubricant loss and entry of dirt are both important concerns, particularly in an application such as a construction dozer which frequently works in dust and dirt.

Figure 11:
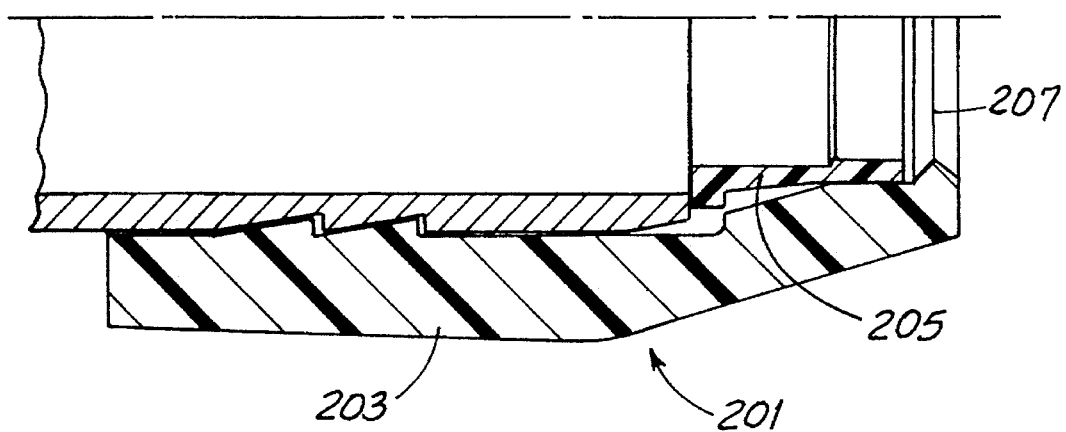
FIG. 11 is an enlarged half cross-section elevation view of a prior art sealing device.
Figure 12:
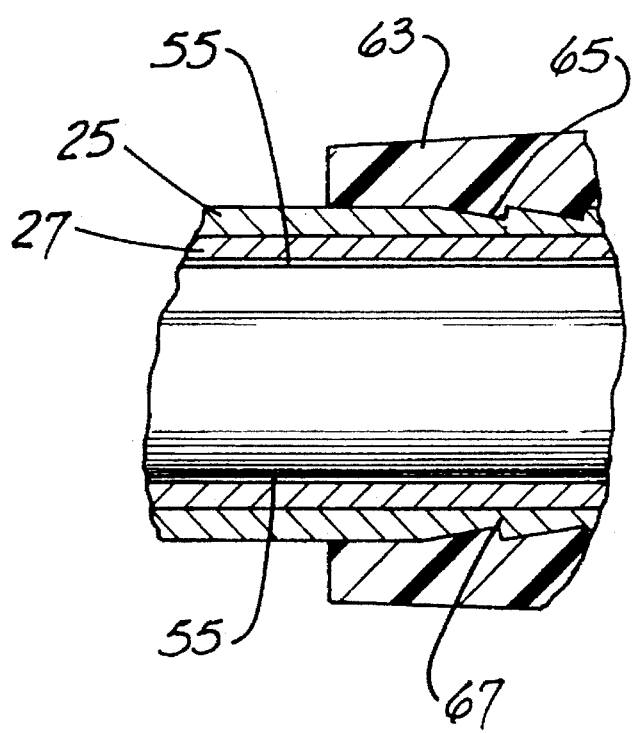
FIG. 12 is a partial cross-sectional elevation view showing the gap between the cable and conduit.

Referring to FIG. 11, the two-piece prior art seal 201 shown therein was heretofore used to seal the clearance 55. Such seal 201 has an outer body 203 and an inner liner 205 made of a material disparate from that used to make the body 203. A single ridge 207 seals against the rod-like control member 37 and in use, dirt particles 59 are on one side of the ridge 207 and lubricant 53 is on the other.

Figure 5:
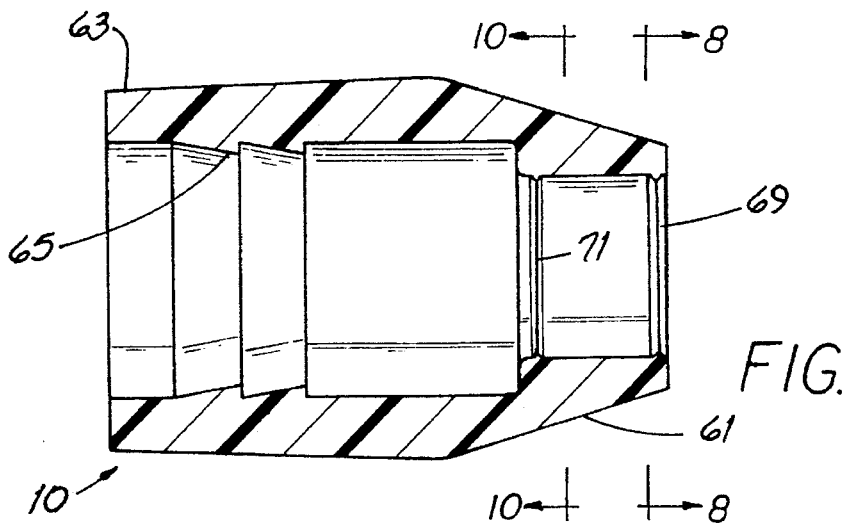
FIG. 5 is an enlarged cross-section side elevation view of the new sealing device in a repose position.
Figure 6:
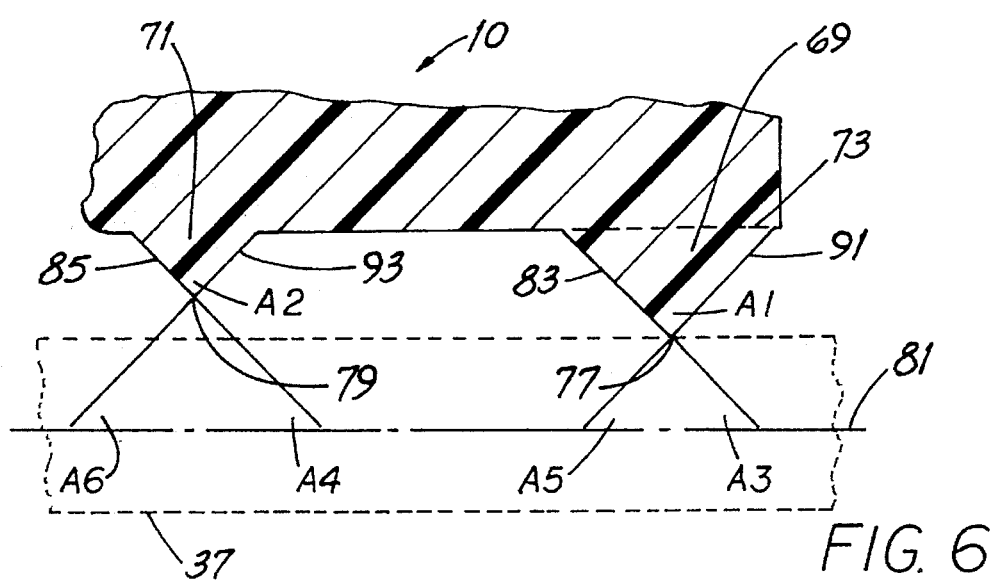
FIG. 6 is a greatly enlarged cross-section side elevation view of a portion of the sealing device of FIG. 5 in a repose position. Parts are broken away and the device is shown in conjunction with a control member in dashed outline and not to scale.
Figure 7:
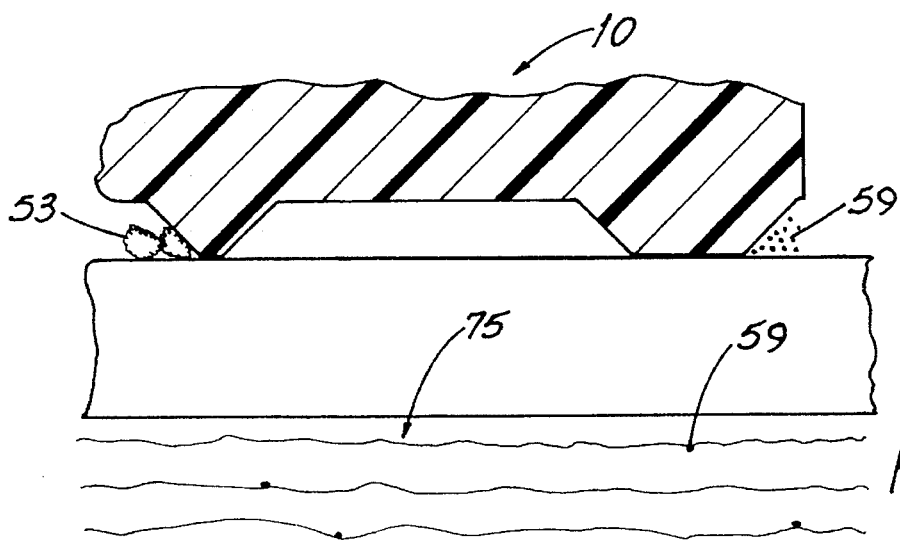
FIG. 7 is a view like that of FIG. 6 except the sealing device is squeezed against the control member.

Referring now to FIGS. 5, 6 and 7, the invention involves a new dynamic sealing device 10 for sealing the thin annular clearance 55 between a stationary portion of a control cable 11, e.g., the cable sleeve 25, and a control member 37 mounted for movement with respect to such sleeve 25. (The device 10 is referred to as "dynamic" since, unlike the sleeve seal 29, the device 10 seals between a stationary part and a movable part.)

The sealing device 10 has a first end 61 which provides sealing and a second end 63 which has barb-like portions 65. Such portions 65 fit into conformably-shaped grooves 67 in the sleeve 25 and the device 10 is thereby firmly retained on the sleeve 25.

At its first end 61, the device 10 has a first ridge 69 which seals against the control member 37 and also includes a second ridge 71 which seals against such member 37. The second ridge 71 is between the first ridge 69 and the second end 63 and is spaced from the first ridge 69, preferably by at least 1.5 to 2 times the axially-measured dimension of a ridge base portion 73. The control cable 11 has a lubricant 53 within it (between the cable conduit 45 and the cable core 39) and such cable 11 is surrounded by ambient air 75 which, very often, has airborne particles 59.

The first ridge 69 (that ridge closest to the device exterior) substantially prevents the particles 59 from entering the cable 11 and the second ridge 71 substantially retains the lubricant 53 within the cable 11. The new sealing device 10 "segregates" the lubricant-retention function from the contaminant-excluding function. For lubricant 53 to escape or for dirt particles 59 to enter, either must get past both ridges 69, 71, an unlikely event.

As best seen in FIGS. 5 and 6, each of the ridges 69, 71 is generally triangular in cross-section. And each such ridge 69, 71 has an apex-like edge with an included angle A1, A2, respectively. In a highly preferred arrangement, the included angle A1 of the first ridge 69 and that of the second ridge 71 are substantially equal to one another and are about 90°.

In another aspect of the invention, the rod-like control member 37 has a central axis 81 extending along it. Each of the ridges 69, 71 has an "interior-directed" face 83, 85, respectively, i.e., a surface facing generally toward what may be referred to as the interior portion of the cable 11. Projected, each such interior-directed face 83, 85 defines an included face angle A3, A4 with the central axis 81 and in the preferred embodiment, such face angles A3, A4 are substantially equal to one another and are about 45°.

Further, each of the ridges 69, 71 has an "exterior-directed" face 91, 93, respectively, i.e., a surface facing generally toward the rod-engaging end 61 of the device 10. Projected each exterior-directed face 91, 93 also defines an included face angle A5, A6, respectively, with the central axis 81 and, preferably, such face angles A5, A6 are also substantially equal to one another and are about 45°. It has been found through extensive testing that face angles A3–A6 as described above provide optimum performance, irrespective of whether the control member 37 is being moved inward or outward with respect to the sleeve 25.

Figure 8:
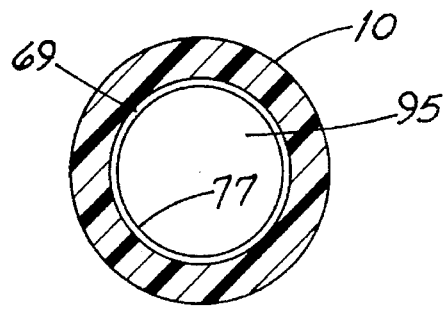
FIG. 8 is an enlarged cross-section elevation view of the sealing device taken along the viewing plane 8—8 of FIG. 5.
Figure 9:
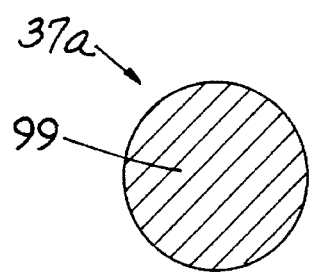
FIG. 9 is an enlarged cross-section end elevation view of the rod-like control member against which the device of FIG. 5 seals.
Figure 10:
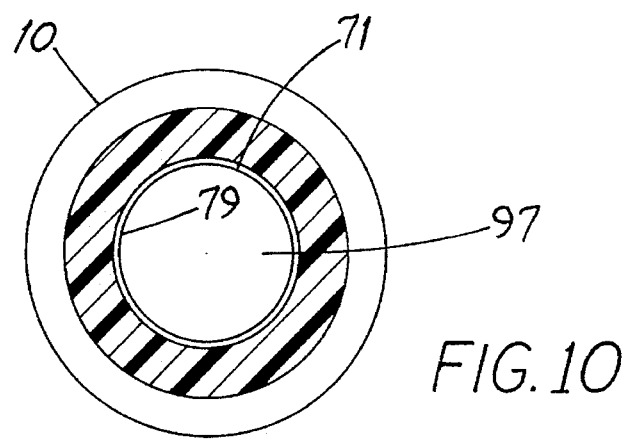
FIG. 10 is an enlarged cross-section elevation view of the sealing device taken along the viewing plane 10—10 of FIG. 5.

Referring now to FIGS. 8, 9 and 10, the edge 77 of the first ridge 69 circumscribes a first ridge area 95, i.e., the area 95 of the circular opening bounded by such edge 77 and through which the member 37 extends. Similarly, the edge 79 of second ridge 71 circumscribes a second ridge area 97 through which the member 37 extends. In the preferred embodiment, the ridge areas 95, 97 are different from one another so that they provide different "squeeze factors" as to the rod or rod-like control member 37 against which they seal.

Considering such first and second ridge areas 95, 97 in view of the cross-sectional area 99 of the rod 37a, the first ridge area 95 is preferably in the range of 10–18% less than the rod cross-sectional area 99 and most preferably is about 12–14% less than such area 99. Further, the second ridge area 97 is preferably in the range of 7–11% less than the rod cross-sectional area 99 and most preferably is about 9% less than such area 99. Since the first ridge 69 fits somewhat more snugly to the rod 37a than does the second ridge 71, the first ridge 69 is said to have a greater squeeze factor.

In a highly preferred embodiment, the sealing device 10 is of one-piece construction. Such device 10 is made of a homogeneous plastic-like material, e.g., a thermoplastic polyurethane, having about 15% polytetrafluoroethylene (PTFE) entrained therein. That is to say, the plastic-like material is homogeneous and the PTFE is blended uniformly throughout such material rather than being "layered" or "faced" thereon. The new sealing device 10 provides dramatically improved performance and was discovered only after repeated tests of a number of devices having several other configurations.

Yet another aspect of the invention involves the core jacket 43. Such jacket 43 is formed of a material which includes polytetrafluoroethylene (PTFE). Preferably, such jacket material is a homogeneous material known as nylon 12 and has about 15–25% (most preferably, about 20%) PTFE powder blended uniformly throughout. Significantly, such material has been known for an estimated two decades—the ingenuity and persistence of the applicant were required to successfully apply it to remote control cables 11. Insofar as is known, applicant is the first to do so.

And that is not all. There are yet other features contributing to the exceptional performance of the invention. In the invention, the dry coefficient of friction between the conduit 45 and the core jacket 43 is less than about 0.20. More specifically, the static coefficient of friction is less than about 0.12 and the dynamic coefficient of friction is less than about 0.18. Both figures represent substantial reductions in the coefficients of friction for the corresponding prior art cable.

As noted above, the cable 11 shown in FIG. 2 has a conduit 45 with a liner 47. The new cable 11 has a lubricant 53 between the conduit 45 and the core jacket 43 (and, specifically, between the conduit liner 47 and such jacket 43) which, preferably, is a synthetic lubricant.

A satisfactory lubricant 53 has a National Lubrication Grease Institute (NLGI) index of between 1.2 and 1.8, most preferably about 1.5. (Such index is roughly analogous to viscosity of motor oil.) The preferred lubricant 53 contains at least about 10% PTFE powder and most preferably about 20–30% PTFE powder.

Referring again to FIGS. 3 and 4 in another aspect of the invention, the jacket 43 is embodied as a cylindrical wall which is annular in cross-section. In a preferred cable 11, the jacket 43 has a radial wall thickness T1 in excess of about 0.029–0.030 inches. This compares to a thickness of about 0.0155 inches in the corresponding prior art cable. And most preferably, the wall thickness T1 is in excess of about 0.040, e.g., about 0.047 inches.

Such increase in wall thickness (by up to a factor of 3) contributes dramatically to the column strength of the core 39, increasing it up to about twice that of the core column strength of the corresponding prior art cable. A benefit of such increased column strength is that when the control cable 11 is used in applications where the core 39 must be "pushed" (placed in compression), much higher forces can be applied without substantial risk of core deformity. (Attempts by others to increase column strength have involved using a wire rope with only a few strands. Column strength was, in fact, increased but at the expense of a dramatic reduction in flexibility and product life.)

And unlike the corresponding prior art cable, certain versions of the new cable 11 are free of "armor" around the center wire rope 41. An armor-free core 39 is significantly less expensive to manufacture. (The depiction of FIG. 3 has a portion 103 showing an "armor" core. Such core has a central wire rope 41 spirally over-wrapped with an "armor" comprising a thin, ribbon-like steel band 105 swaged in place. The jacket 43 overlays such armor or, in the new cable 11, the wire rope 41.)

Referring again to FIG. 4 the new cable 11 has an annular "gap" or space 107 between the inner liner 47 and the core 39. In the invention, the nominal radial dimension T2 of the space 107 does not exceed about 0.0075 inches. Such dimension T2 represents a reduction of about 0.0025 inches from the radial dimension of the space in the corresponding prior art cable.

While the principles of the invention have been described in connection with specific embodiments, it is to be understood clearly that such embodiments are by way of example and are not limiting.

What is claimed:

1. In a device for sealing between a control cable sleeve and a rigid control member which has an outer diameter and which is mounted for linear movement with respect to such sleeve and wherein the device (a) has a first end and a second end, (b) has a ridge at the first end which seals against the control member, and (c) is attached to the sleeve at the second end, the improvement wherein:

the ridge is a first ridge having an interior diameter;

the sealing device includes a second ridge between the first ridge and the second end;

the second ridge has an interior diameter;

the interior diameter of each ridge is less than the outer diameter of the control member; and the device is devoid of any additional edge element scraping the control member.

2. The device of claim 1 wherein the control cable:

has a lubricant there within and is surrounded by ambient air bearing particulate contaminants;

and wherein:

the first ridge substantially prevents the contaminants from entering the cable; and the second ridge substantially retains the lubricant within the cable.

3. The device of claim 1 wherein:

the first ridge has an edge circumscribing a first ridge area;

the second ridge has an edge circumscribing a second ridge area; and the ridge areas are different from one another.

4. The device of claim 3 wherein:

the control member is a rod having a rod cross-sectional area; and the first ridge area is in the range of 10–18% less than the rod cross-sectional area.

5. The device of claim 3 wherein:

the control member is a rod having a rod cross-sectional area; and the second ridge area is in the range of 7–11% less than the rod cross-sectional area.

6. The device of claim 5 wherein:

the first ridge area is in the range of 10–18% less than the rod cross-sectional area.

7. The device of claim 1 in combination with a control cable and wherein (a) the control member is rod-like and is coupled to a core coaxial with the control member, (b) the core has a jacket, and:

the jacket is annular in cross-section and has a wall;

the wall has a thickness in excess of 0.030 inches; and the jacket is formed of a material which includes polytetrafluoroethylene (PTFE).

8. The combination of claim 7 wherein:

the control cable has a conduit; and a synthetic lubricant containing at least about 10% by weight polytetrafluoroethylene (PTFE) powder is between the conduit and the core jacket.

9. The combination of claim 8 wherein:

the conduit has an inner liner;

there is an annular space between the inner liner and the core; and the nominal radial dimension of the space does not exceed about 0.0075 inches.

10. In a control cable having a conduit and a core mounted for movement relative to the conduit and wherein (a) the core has an annular jacket, and (b) the jacket has a wall, the improvement wherein:

the wall has a thickness of at least about 0.029 inches.

11. The cable of claim 10 wherein the jacket is made of a substantially homogeneous material which includes at least 10% by weight polytetrafluoroethylene (PTFE) powder.

12. The cable of claim 10 wherein:

the conduit and the core have a coefficient of friction with respect to one another; and the coefficient of friction is less than about 0.20.

13. The cable of claim 12 wherein:

the coefficient of friction is a static coefficient of friction and is less than about 0.12.

14. The cable of claim 12 wherein:

the coefficient of friction is a dynamic coefficient of friction and is less than about 0.18.

15. The cable of claim 10 including a sleeve and a control member coupled to the core and coaxial with the core jacket and wherein (a) the sleeve and the control member have a space therebetween and (b) the cable has a device sealing the space, such device including:

a first end having a first ridge sealing against the control member, such first ridge having a diameter;

a second end attached around the sleeve;

a second ridge between the ends and spaced from the first ridge, such second ridge having a diameter different from the diameter of the first ridge.

16. The cable of claim 15 wherein each ridge has an interior diameter and the interior diameter of the first ridge differs from the interior diameter of the second ridge.

17. The cable of claim 16 wherein the interior diameter of the second ridge is greater than the interior diameter of the first ridge.

18. In a control cable having a sleeve and a control member and wherein (a) the sleeve and the control member have a space therebetween and (b) the cable has a device sealing the space, the improvement wherein the device includes:

a first ridge having an apex circumscribing a first ridge area;

a second ridge having an apex circumscribing a second ridge area; and the ridge areas are different from one another.

19. The cable of claim 18 wherein:

the control member is a rod linearly movable with respect to the device and having a rod cross-sectional area; and the first ridge area is in the range of 10–18% less than the rod cross-sectional area.

20. The cable of claim 18 wherein:

the control member is a rod linearly movable with respect to the device and having a rod cross-sectional area; and the second ridge area is in the range of 7–11% less than the rod cross-sectional area.

21. The cable of claim 20 wherein:

the first ridge area is in the range of 10–18% less than the rod cross-sectional area.

22. In a remote control cable having (a) a conduit with an interior surface, (b) a core mounted for low-speed linear movement in the conduit and having a core surface adjacent to the interior surface and defining a space therebetween, (c) a rod-like control member, and (d) a device sealing between the conduit and the control member, the improvement wherein:

the device has first and second ridges spaced from one another and sealing against the control member;

the cable includes a lubricant in the space, such lubricant containing at least about 10% by weight polytetrafluoroethylene (PTFE) powder; and the nominal radial dimension of the space does not exceed about 0.0075 inches.

23. The cable of claim 22 wherein:

the first ridge has an edge circumscribing a first ridge area;

the second ridge has an edge circumscribing a second ridge area; and the second ridge area is greater than the first ridge area.

24. The cable of claim 22 wherein:

the core has an annular jacket;

the jacket has a wall; and the wall has a thickness of at least about 0.029 inches.

25. The cable of claim 22 wherein:

the first ridge has a ridge base portion; and the first and second ridges are spaced from one another by at least 1.5 times the dimension of the ridge base portion.

26. In a remote control cable having (a) a conduit with an interior surface, (b) a core mounted for low-speed linear movement in the conduit and having a core surface adjacent to the interior surface and defining a space therebetween, (c) a rod-like control member, and (d) a device sealing between the conduit and the control member, the improvement wherein:

the device has first and second ridges spaced from one another and sealing against the control member;

the cable includes a lubricant in the space, such lubricant containing at least about 10% by weight polytetrafluoroethylene (PTFE) powder;

the core has an annular jacket;

the jacket has a wall; and the wall has a thickness of at least about 0.029 inches.

* * * * *